(12) United States Patent
Everett et al.

(10) Patent No.: US 6,366,894 B1
(45) Date of Patent: Apr. 2, 2002

(54) VALUE TRANSFER SYSTEM

(75) Inventors: David Barrington Everett, Brighton; John Viner, Wyndlesham, both of (GB)

(73) Assignee: Mondex International Limited, London (GB)

(*) Notice: Subject to any disclaimer, the term of this patent is extended or adjusted under 35 U.S.C. 154(b) by 0 days.

(21) Appl. No.: 08/973,708

(22) PCT Filed: Jun. 28, 1996

(86) PCT No.: PCT/GB96/01564

§ 371 Date: Feb. 23, 1998

§ 102(e) Date: Feb. 23, 1998

(87) PCT Pub. No.: WO97/02548

PCT Pub. Date: Jan. 23, 1997

(30) Foreign Application Priority Data

Jun. 30, 1995 (GB) .............................................. 9513379

(51) Int. Cl.[7] .............................................. G06F 17/60
(52) U.S. Cl. .............................. 705/76; 705/64; 705/71
(58) Field of Search ........................... 380/2, 3, 4, 21, 380/23, 28, 29, 49, 277; 902/2, 4, 26; 235/380, 382; 705/1, 64, 71, 76, 65, 69

(56) References Cited

U.S. PATENT DOCUMENTS

| | | | |
|---|---|---|---|
| 4,855,578 A | 8/1989 | Hirokawa et al. | 235/380 |
| 4,972,472 A | * 11/1990 | Brown et al. | 705/71 |
| 5,461,217 A | * 10/1995 | Claus | 235/380 |
| 5,517,568 A | * 5/1996 | Grube et al. | 380/49 X |

FOREIGN PATENT DOCUMENTS

| | | | |
|---|---|---|---|
| EP | 0159651 | 10/1985 | G07F/7/10 |
| EP | 0256768 | 2/1988 | G07F/7/10 |
| EP | 0513507 | 11/1992 | G06K/19/07 |
| WO | WO 91/16691 | * 10/1991 | |

OTHER PUBLICATIONS

Kutler, "Natwest Makes 1st Major Sale of Smart Card Payment System" American Banker, v.159, n.206, Oct. 1994.*

* cited by examiner

*Primary Examiner*—Melanie A. Kemper
(74) *Attorney, Agent, or Firm*—Volpe and Koenig, P.C.

(57) ABSTRACT

A value transfer system using integrated circuit cards for exchanging electronic cash in off-line transactions employs cryptographically secure message protocols. Cards are loaded each with two schemes from a series and interaction between cards determines and uses the oldest scheme shared by the cards, causing one card to switch schemes irrevocably if that common scheme is its second scheme. In this way, a switch to a new scheme can migrate through the system.

16 Claims, 1 Drawing Sheet

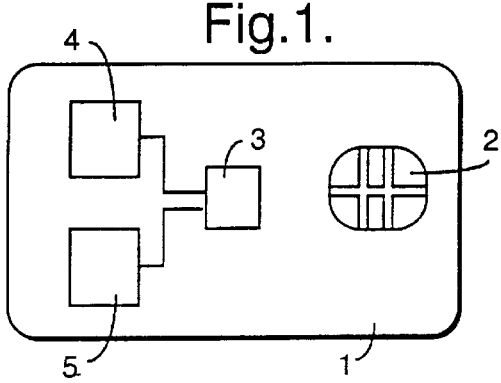
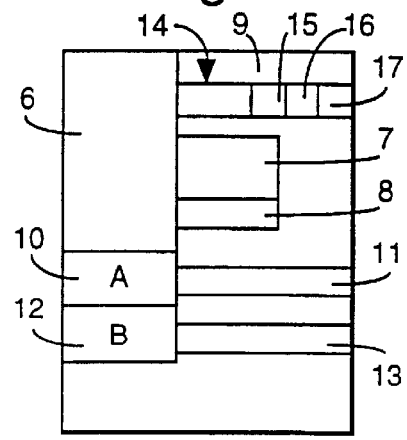
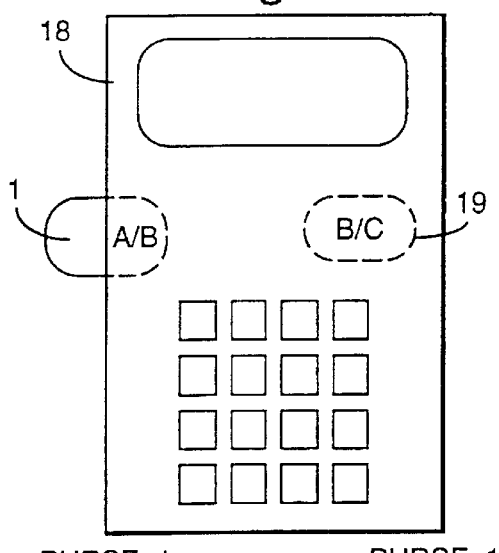
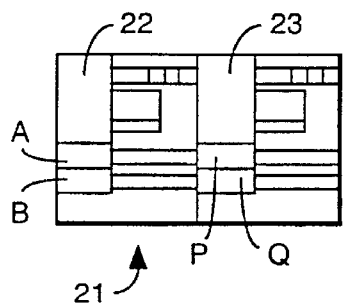
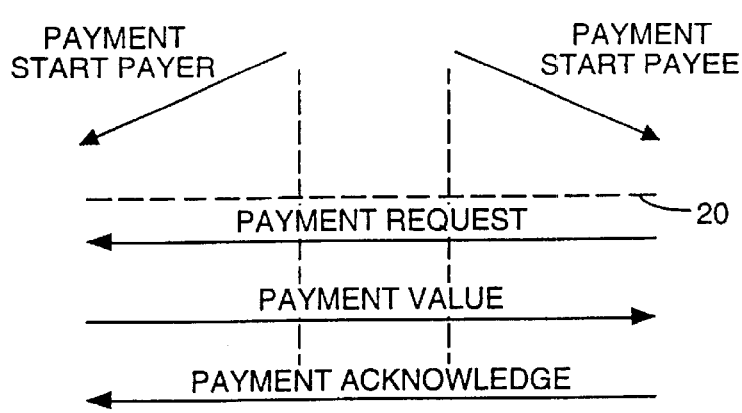

VALUE TRANSFER SYSTEM

The invention relates to a value transfer system in which value is transferred between electronic purses. One such system is described, for example, in patent application WO 91/16691.

In the system described in the above-mentioned patent specification integrated circuit cards (ICC's) or "Smart Cards" are used as application carrier devices (ACD's) to carry electronic purses. An electronic purse is a program application which controls the storage in memory on the ACD of a value record which represents "electronic cash". By coupling two ACD's together via interface devices (IFD's) the respective purses are coupled together and exchange a series of messages which results in the transfer of value from one purse to the other.

It is clear that security against fraud is vital in a value transfer system. The manufacturing process of ICC's and increasingly sophisticated security measures included in their manufacture and programming make it virtually impossible to counterfeit the smart cards. Interception and duplication of the value transfer messages is prevented by cryptographically encoding messages exchanged in a transaction. In spite of the extremely high security levels achieved by modern cryptography there is a theoretical risk that a particular cryptographic system could be compromised, if not by crypto-analysis then perhaps by a breach of physical security which leads to leakage of algorithms or keys.

An object of the present invention is to provide a value transfer system in which the cryptographic system currently in use may be changed. Administratively, change may be effected as a regular precautionary measure or in response to an attack on the system currently in use.

According to one aspect of the invention there is provided a value transfer system comprising a multiplicity of electronic programmed microprocessor application carrier devices (ACD's) each comprising an electronic purse having a value store, the ACD's being adapted to be coupled together in pairs so as to couple the purses and enable value to be exchanged in transactions between the purses, said value exchange being effected by exchanges of messages secured by a cryptographic security scheme, the system further comprising a sequential series of cryptographic security schemes ranging from old to new and each purse being programmed with at least two schemes in said series, the purses being further programmed to identify and use, when coupled in a pair to exchange value between electronic purses, the older or oldest usable common cryptographic security scheme of the purse pair and to inhibit thereafter as superceded any older cryptographic security scheme of the series in either purse. With this arrangement a first purse can be automatically switched from an old cryptographic system to a new one on encountering a second purse which has the new system but not the old. On being switched, the first purse Will then have no usable old system and then can itself cause other purses to switch to the new system. Thus, by seeding the population of purses with new purses which omit the old cryptographic system, the new cryptographic system will migrate through the population of purses in a chain reaction.

Preferably each purse has a memory region in which is stored an identifier for the cryptographic security scheme currently in use by the purse, the scheme identifiers being exchanged between a coupled pair of purses as a preliminary in a value exchange transaction.

Whilst it is envisaged that the purses may have three or more cryptographic systems to which to be switched in sequence, in a preferred embodiment of the invention each purse is programmed with two successive cryptographic security schemes in the sequential series.

Preferably each cryptographic security scheme comprises at least one cryptographic algorithm and at least one cryptographic key and members of the series differ in respect of their algorithms and/or their keys. The above-mentioned patent application describes use of the RSA encryption system, which is an asymmetric public/private key system. Also there is described exchange of keys by means of the DES system. The encryption schemes of the present invention may differ from each other because they employ different single encryption algorithms such as RSA or DES or because they combine the algorithms of different systems or because the keys are different.

Successive cryptographic schemes in the series are not necessarily different. It may be desirable to force current smart cards towards obsolescence by making them switch to a new cryptographic scheme even though it is the same as the old one. Thus, in one embodiment of the invention successive members of the series of cryptographic security schemes are the same except that they are associated with different scheme identifiers, the scheme identifiers being stored in the purses and being used to identify the oldest common cryptographic scheme of a pair of coupled purses and to control the inhibition of any older cryptographic security scheme of the series in either purse.

Furthermore, selected ACD's may be provided with two electronic purses programmed with respective and different cryptographic security schemes, said selected ACD's being programmed, on being coupled to another ACD, to select a purse so as to allow a transaction between the purse of the said other ACD and the selected purse according to compatibility of the purse cryptographic security systems.

According to another aspect of the invention there is provided a value transfer system comprising a multiplicity of electronic programmed microprocessor application carrier devices (ACD's) each comprising an electronic purse having a value store, the ACD's being adapted to be coupled together in pairs so as to couple the purses and enable value to be exchanged in transactions between the purses, said value exchange being effected by exchange of messages secured by a cryptographic security scheme, wherein selected ACD's are provided with two electronic purses programmed with respective and different cryptographic security schemes, said selected ACD's being programmed, on being coupled to another ACD to select a purse so as to allow a transaction between the purse of the said other ACD and the selected purse according to compatibility of the purse cryptographic security systems. With this arrangement it is possible to provide a cut-off strategy for a particular cryptographic scheme or set of schemes. By providing selected purses, for example retailers and banks, with dual purse smart cards (ACD's), one purse having the old schemes and the other purse having new schemes, it is possible to isolate "old money" from "new money" while allowing transactions with the old schemes to continue, perhaps for a limited time.

The invention will further be described with reference to the accompanying drawings, of which:

FIG. 1 is a schematic diagram of an application carrier device in the form of an integrated circuit card (ICC) in a system according to the invention;

FIG. 2 is a diagram illustrating memory allocation in an electronic purse loaded on the ICC of FIG 1;

FIG. 3 is a diagram illustrating a value transfer transaction between two purses of a system in accordance with the invention; and FIG. 4 is a diagram illustrating a purse arrangement for effecting cryptographic cut-off in a system in accordance with the invention.

It is to be understood that the present invention is a development of the value transfer system described in patent application No. WO 91/16691. That specification describes the use of ICC's as application carrier devices for carrying electronic purses. The electronic purses have records of various kinds held in electrically erasable programmable read-only memory (EEPROM) including value records for holding value, log records etc. The purse may be coupled via interface devices to exchange value in accordance with protocols involving the exchange of cryptographically secure messages. Electronic cash may thus be withdrawn from a bank, exchanged in off-line transactions with, for example, retailers and redeemed at a bank. For the sake of brevity many of the technical details of the system will not be repeated herein but where necessary reference may be made to the above-mentioned earlier patent specification.

FIG. 1 illustrates an application carrier device (ACD) in the form of an ICC 1. The ICC has on one surface a contact pad 2 carrying several separate electrical contacts whereby an external power source may be connected to power the card and a serial communication channel may be established to transmit data to and from the card. The card includes a microprocessor 3, an EEPROM 4 and a random access memory 5.

The EEPROM 4 holds an operating system which comprises three sub-systems: (a) a file manager; (b) a run-time executive; and (c) a BIOS (binary input/output system). When loaded, the operating system is used to load into the EEPROM an electronic purse, which is an application, namely a program with associated data files.

FIG. 2 shows some of the elements of an electronic purse as schematic allocations of regions of the EEPROM. Operation of the purse is controlled by a program at 6 which has associated data files. For example there is a value record at 7, transaction logs at 8 and a unique purse identifier at 9. Security is maintained by the use of cryptographic schemes and this purse holds two schemes. Scheme A has algorithms at 10 and a set of cryptographic keys at 11. Scheme B has algorithms at 12 and a set of cryptographic keys at 13. A crypto file 14 includes three single-byte fields: cut-off domain 15; migration level 16 and migrated flag 17.

The value of the cut-off domain byte indicates the particular cut-off domain in which the purse exists. Purses of different domains do not communicate with each other. Thus, if a major change in the system is deemed desirable from a particular cut-off date then all new purses from that date will have a new cut-off domain byte at 15. In a particular domain, a series of cryptographic schemes is defined. For example, in the first domain there may be the series A, B, C, D, E where A is the first, or oldest scheme to be used and E is the last, or newest in the series. Each purse includes two successive schemes of the series. The first set of purses will include schemes A and B, which can be termed respectively the initial and final schemes for this purse. This set of purses may be called Issue 1. The migration level byte 16 holds, for example, "A" which indicates that the purse includes schemes A and B, namely that this purse is Issue 1 in the cut-off domain. In a manner to be described, the purse can be irrevocably switched from using scheme A to using scheme B. The value of the migrated flag byte 17 indicates whether this switch has taken place. Thus, by reading bytes 15 to 17 the particular cryptographic scheme currently in use by the purse can be determined.

When two purses, X and Y, communicate for a value transfer the security schemes used are determined by the following rules:

i) If the current schemes of X and Y are the same then this scheme is used, and no scheme changes take place;

ii) If the current schemes of X and Y differ, are adjacent in the cryptographic series, and if the earlier of the two schemes is the initial scheme for the purse to which it belongs, then a permanent switch is made in the purse using its initial scheme so that it will always use its final scheme from now on. Thus the 'final' scheme is designated the current scheme, and the initial scheme on this purse is never used again.

iii) If neither (I) nor (ii) holds, then the purses cannot communicate. The value transfer cannot take place, and no change is made to the security scheme of either.

It will be seen that value transfers between Issue 1 purses take place using scheme A, since this is the oldest common scheme of the two purses. When it is required to phase out Scheme A an issue 2 of purses is released containing schemes B and C. When a value transfer takes place between an Issue 1 and an Issue 2 purse rule (ii) comes into play and an irreversible switch is made in the Issue 1 purse to use scheme B from now on. Then, the Issue 1 purse becomes an agent for change itself, since when a value transfer takes place between it and another Issue purse, which has not been switched to scheme B, then rule (ii) again 1 comes into play and the second Issue 1 purse is switched to scheme B. The switching is effected by changing the migrated byte 17 in the EEPROM.

Gradually, by a process of osmosis, the Issue 1 purses switch over to scheme B. The changeover will be quite rapid if Issue 2 is released widely (to retail outlets for example), though in theory one purse could be sufficient to trigger the whole process.

A change from B to C is carried out in the same way by creating an Issue 3 with schemes C and D. Once this Issue, and hence scheme C, are established, Issue 1 purses are no longer usable.

Note that the switchover does not depend in any way on dates. This is deliberate as dates cannot necessarily be relied on, and clocks are not mandated for all equipment. No decision on the life of a scheme needs to be taken when the purses containing it are issued.

FIG. 3 shows a point-of-sale terminal 18 at a retailer site. Terminal 18 is an interface device and holds the retailer's ICC 19 which includes the retailer purse 19a. The customer ICC 1 of FIGS. 1 and 2 can be inserted into a slot in the body of the terminal 18. In this example the customer card 1 has a purse 1a with schemes A and B and the retailer card 19 has a purse 19a with schemes B and C.

As described in the above-mentioned earlier patent specification a value transfer transaction includes three essential cryptographically signed messages:

(a) Request to Send—from the payee (retailer) purse to the payer (customer) purse requesting an agreed value V.

(b) Payment value—from the payer purse to the payee purse including the payment command to pay V.

(c) Payment Acknowledge—from the payee purse to the payer purse to acknowledge receipt of value V.

These are the payment messages and as described in the earlier patent specification these are cryptographically signed and verified.

Before the payment phase in which the payment messages are sent there is a pre-payment phase in which information is exchanged between the purses concerning purse status. This information is transmitted in clear, i.e. non-cryptographically. Data received at this stage by one purse from the other purse is "counterparty purse data".

Referring to FIG. 3 a sequence of messages is shown for the transaction between the customer purse 1a and the retailer purse 19a. Messages above line 20 are pre-payment messages sent in clear and messages below line 20 are cryptographically signed. Firstly, by sending interrogation commands to both purses the terminal 18 derives responses which contain purse status information. Included in the purse status information is the value of bytes 15 to 17 which collectively indicate the current cryptographic scheme of the series A to E under which each purse is operating.

Purse 1a receives a "Payment Start Payer" message from the terminal 18 and from counterparty purse data it determines that purse 19a is currently on scheme B and deduces that it (purse 1a) will migrate to scheme B.

Purse 19a receives a "Payment Start Payee" message from the terminal 18 and from counterparty purse data it recognises that purse 1a is currently at scheme A and will migrate to scheme B. Purse 19a sends a Payment Request message based on scheme B and containing information as to the value of bytes 15 to 17 in its EEPROM. Purse 1a expects purse 19a to be using scheme B. It checks the Payment Request signature using scheme B. As part of checking the incoming signature, it checks that purse 19a has a correct understanding of what migration will occur— i.e. purse 1a will migrate and purse 19a will not. In this way any anomalies can be resolved. For example, it is not possible for both purses to migrate. If this should be indicated then the transaction is aborted and neither purse migrates. If the Payment Request signature is valid purse 1a migrates irrevocably to scheme B by setting byte 17 in its EEPROM.

Purse 1a sends a Payment Value message to purse 19a. This is cryptographically signed and includes information concerning bytes 15 to 17, showing that the purse 1a has migrated to scheme B. Purse 19a uses scheme B to check the signature from purse 1a. Finally, purse 19a sends a Payment Acknowledge message to purse 1a, signed cryptographically and including again information concerning its bytes 15 to 17. Thus, it is to be noted that scheme status information is firstly exchanged in clear between the purses and is then incorporated in all three of the basic cryptographically signed payment phase messages. The information in these signed messages is derived internally within the ICC and cannot be simulated externally in an attempt to fraudulently force scheme migration.

A similar procedure to that described above takes place when the cryptographic scheme of the payee purse is to be caused to migrate because of a transaction with a customer purse with a newer current scheme. Here migration is effected in the payee purse on receipt of a valid signed Payment Value message.

While the above description relates to progressive migration to successive cryptographic schemes there may be occasions when it is necessary to implement-cut-off. Cut-off is a strategy for abandoning all cryptographic schemes hitherto in use in a system and re-starting with a new cryptographic scheme or series of schemes. Cut-off may be necessary, for example, to force re-call of existing ICC's if a significant improvement in the system is to be implemented or if a serious breach of security is discovered.

In order to implement cut-off special ICC's would be introduced into the scheme. The EEPROM of one such ICC is shown in FIG. 4 at 21. The EEPROM has two purses 22 and 23, each with two cryptographic schemes.

In the event of a security breach, the two purses would have schemes belonging to an "old" and a "new" series and the two series would be totally distinct and non-overlapping. However, if the system is not cryptographically compromised and cut-off is introduced for administrative reasons it is possible that the two series could be the same. However, the two purses belong to different cut-off domains and have different respective values in byte 15. The programs of the purses will therefore not recognise any common cryptographic scheme with another purse having a different cut-off domain value, since this value is part of the cryptographic scheme identifier. Thus, purses may exchange value only with purses of the same cut-off domain. Selection of which purse to use in ICC 21 is made by a program routine which identifies the value of byte 15 in the customer purse from the counter party purse data.

The provision of retailer cards with two purses of different domains allows transactions to continue with old purses while new cards are introduced. This period of overlap can be time-limited. The consequence of the arrangement is that electronic cash issued under the original domain is isolated from that under the new domain so that any damage to the system as a whole may be limited.

What is claimed is:

1. A value transfer system comprising a multiplicity of electronic programmed microprocessor application carrier devices (ACD'S) each comprising an electronic purse having a value store, the ACD's being adapted to be coupled together in pairs so as to couple the purses and enable value to be exchanged in transactions between the purses, said value exchange being effected by exchanges of messages secured by a cryptographic security scheme, the system further comprising a sequential series of cryptographic security schemes ranging from old to new and each purse being programmed with at least two schemes in said series such that when two purses are coupled in a pair to exchange value between electronic purses, the oldest usable cryptographic security scheme common to both said two purses is identified and used and any cryptographic security scheme of the series in either said two purses which is older than the oldest common scheme is render unusable or, if there is no useable cryptographic security scheme common to both said two purses, the exchange of value is not permitted whereby for first and second purses having useable schemes A and B, where A is older than B, and a third purse having scheme B as its oldest usable scheme, the coupling of said first purse with said second purse results in scheme A being rendered unusable:

1) in said first purse if said second purse is first coupled with said third purse and then coupled with said first purse before being coupled with any other purse, and 2) in said second purse if said first purse is first coupled with said third purse and then coupled with said first purse before being coupled with any other purse.

2. A value transfer system as claimed in claim 1 wherein each purse has a memory region in which is stored an identifier for the cryptographic security scheme currently in use by the purse, the scheme identifiers being exchanged between a coupled pair of purses as a preliminary in a value exchange transaction.

3. A value transfer system as claimed in claim 1 wherein each purse is programmed with two successive cryptographic security schemes in the sequential series.

4. A value transfer system as claimed in claim 1 wherein each cryptographic security scheme comprises at least one cryptographic algorithm and at least one cryptographic key and members of the series differ in respect of their algorithms or their keys.

5. A value transfer system as claimed in claim 1 wherein successive members of the series of cryptographic security schemes are the same except that they are associated with different scheme identifiers, the scheme identifiers being stored in the purses and being used to identify the oldest common cryptographic scheme of a pair of coupled purses and to control the inhibition of any older cryptographic security scheme of the series in either purse.

6. A value transfer system as claimed in claim 1 wherein selected ACD's are provided with two electronic purses programmed with respective and different cryptographic security schemes, said selected ACD's being programmed, on being coupled to another ACD to select a purse so as to allow a transaction between the purse of the said other ACD and the selected purse according to compatibility of the purse cryptographic security systems.

7. A value transfer system as claimed in claim 2 wherein each purse is programmed with two successive cryptographic security schemes in the sequential series.

8. A value transfer system as claimed in claim 2 wherein each cryptographic security scheme comprises at least one cryptographic algorithm and at least one cryptographic key and members of the series differ in respect of their algorithms or their keys.

9. A value transfer system as claimed in claim 7 wherein each cryptographic security scheme comprises at least one cryptographic algorithm and at least one cryptographic key and members of the series differ in respect of their algorithms or their keys.

10. A value transfer system as claimed in claim 2 wherein successive members of the series of cryptographic security schemes are the same except that they are associated with different scheme identifiers, the scheme identifiers being stored in the purses and being used to identify the oldest common cryptographic scheme of a pair of coupled purses and to control the inhibition of any older cryptographic security scheme of the series in either purse.

11. A value transfer system as claimed in claim 3 wherein successive members of the series of cryptographic security schemes are the same except that they are associated with different scheme identifiers, the scheme identifiers being stored in the purses and being used to identify the oldest common cryptographic scheme of a pair of coupled purses and to control the inhibition of any older cryptographic security scheme of the series in either purse.

12. A value transfer system as claimed in claim 4 wherein successive members of the series of cryptographic security schemes are the same except that they are associated with different scheme identifiers, the scheme identifiers being stored in the purses and being used to identify the oldest common cryptographic scheme of a pair of coupled purses and to control the inhibition of any older cryptographic security scheme of the series in either purse.

13. A value transfer system as claimed in claim 2 wherein selected ACD's are provided with two electronic purses programmed with respective and different cryptographic security schemes, said selected ACD's being programmed, on being coupled to another ACD to select a purse so as to allow a transaction between the purse of the said other ACD and the selected purse according to compatibility of the purse cryptographic security systems.

14. A value transfer system as claimed in claim 3 wherein selected ACD's are provided with two electronic purses programmed with respective and different cryptographic security schemes, said selected ACD's being programmed, on being coupled to another ACD to select a purse so as to allow a transaction between the purse of the said other ACD and the selected purse according to compatibility of the purse cryptographic security systems.

15. A value transfer system as claimed in claim 4 wherein selected ACD's are provided with two electronic purses programmed with respective and different cryptographic security schemes, said selected ACD's being programmed, on being coupled to another ACD to select a purse so as to allow a transaction between the purse of the said other ACD and the selected purse according to compatibility of the purse cryptographic security systems.

16. A value transfer system as claimed in claim 5 wherein selected ACD's are provided with two electronic purses programmed with respective and different cryptographic security schemes, said selected ACD's being programmed, on being coupled to another ACD to select a purse so as to allow a transaction between the purse of the said other ACD and the selected purse according to compatibility of the purse cryptographic security systems.

* * * * *